US009428174B2

(12) United States Patent
Lim et al.

(10) Patent No.: US 9,428,174 B2
(45) Date of Patent: Aug. 30, 2016

(54) FORCED CHARGING METHOD FOR PHEV VEHICLES USING MOTOR AND HSG

(71) Applicant: Hyundai Motor Company, Seoul (KR)

(72) Inventors: Jae Sang Lim, Gyeonggi-Do (KR); Gu Bae Kang, Gyeonggi-Do (KR); Young Un Kim, Gyeonggi-Do (KR); Kil Young Youn, Gyeonggi-Do (KR); Jeong Won Roh, Seoul (KR); Ji Wan Cha, Incheon (KR); Jin Ho Kim, Gyeonggi-Do (KR); Seong Yeop Lim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/569,642

(22) Filed: Dec. 13, 2014

(65) Prior Publication Data

US 2016/0046279 A1 Feb. 18, 2016

(30) Foreign Application Priority Data

Aug. 12, 2014 (KR) .......................... 10-2014-0104143

(51) Int. Cl.
*B60W 20/00* (2016.01)
*B60L 11/18* (2006.01)
(Continued)

(52) U.S. Cl.
CPC .............. *B60W 10/26* (2013.01); *B60K 6/442* (2013.01); *B60L 11/1814* (2013.01); *B60L 11/1861* (2013.01); *B60L 11/1862* (2013.01); *B60W 10/08* (2013.01); *B60W 20/106* (2013.01);
(Continued)

(58) Field of Classification Search
CPC .... B60W 10/26; B60W 10/06; B60W 10/08; B60W 10/28; B60W 20/00; Y10S 903/93; B60K 6/46; B60K 6/52; H02J 7/1453; H02J 7/0031; B60L 8/00; B60L 11/18; B60L 11/1809
USPC ........... 701/22; 903/930, 903, 910; 320/107, 320/108, 152; 180/65.28, 65.265
See application file for complete search history.

(56) References Cited

U.S. PATENT DOCUMENTS

2012/0139481 A1* 6/2012 Tani .................... B60L 11/1809
320/107
2012/0191280 A1* 7/2012 Ohno ....................... B60K 6/46
701/22
(Continued)

FOREIGN PATENT DOCUMENTS

DE 102007016514 A1 10/2008
EP 1939059 A2 7/2008
(Continued)

*Primary Examiner* — Marthe Marc-Coleman
(74) *Attorney, Agent, or Firm* — Mintz Levin Cohn Ferris Glovsky and Popeo, P.C.; Peter F. Corless (57) ABSTRACT

A method of forcibly charging a high-voltage battery using a motor and a Hybrid Starter Generator (HSG) is provided. The method forcibly charges the high-voltage battery with maximum charging power using the motor and the HSG simultaneously. Particularly, the method includes calculating maximum chargeable power for the high-voltage battery using three dimensional (3D) maximum charging power maps of the motor and the HSG and adjusting maximum charging power using energy integration during forced charging using the motor and the HSG simultaneously. Additionally, excessive temperature prevention logics are applied for protecting the motor and the HSG from an excessive temperature in a forced charging mode.

20 Claims, 7 Drawing Sheets

(51) Int. Cl.
  *B60W 10/08* (2006.01)
  *B60W 10/26* (2006.01)
  *B60K 6/442* (2007.10)
  *H01M 10/44* (2006.01)
(52) U.S. Cl.
  CPC ............ B60W20/13 (2016.01); H01M 10/44 (2013.01); *B60L 2240/421* (2013.01); *B60L 2240/425* (2013.01); *B60L 2240/441* (2013.01); *B60L 2240/445* (2013.01); *B60L 2260/26* (2013.01); *B60L 2260/44* (2013.01); *B60W 2510/081* (2013.01); *B60W 2510/087* (2013.01); *B60W 2710/242* (2013.01); *Y10S 903/93* (2013.01)

(56) References Cited

U.S. PATENT DOCUMENTS

2014/0052364 A1 2/2014 Kim et al.
2014/0155222 A1 6/2014 Kim

FOREIGN PATENT DOCUMENTS

| JP | 2001-268711 A | 9/2001 |
| JP | 2013-112335 A | 6/2013 |
| KR | 10-0792893 B1 | 1/2008 |
| KR | 10-2013-0068944 A | 6/2013 |
| KR | 10-2013-0109042 A | 10/2013 |

* cited by examiner

FIG. 1

RELATED ART

FORCED CHARGING METHOD FOR PHEV VEHICLES USING MOTOR AND HSG

CROSS-REFERENCE TO RELATED APPLICATION(S)

Pursuant to 35 U.S.C. §119(a), this application claims priority to Korean Patent Application No. 10-2014-0104143 filed on Aug. 12, 2014, the entire contents of which are incorporated herein by reference.

BACKGROUND

1. Technical Field

The present disclosure relates to a method for forcibly charging a high-voltage battery using a motor and a hybrid starter generator (HSG), and more particularly, to a method for forcibly to charge the high-voltage battery with increased or maximum charging power using a motor and a HSG simultaneously in a plug-in hybrid electric vehicle (PHEV) when a vehicle is driven in a forced charging mode of the high-voltage battery.

2. Discussion of the Related Art

Figure 7:
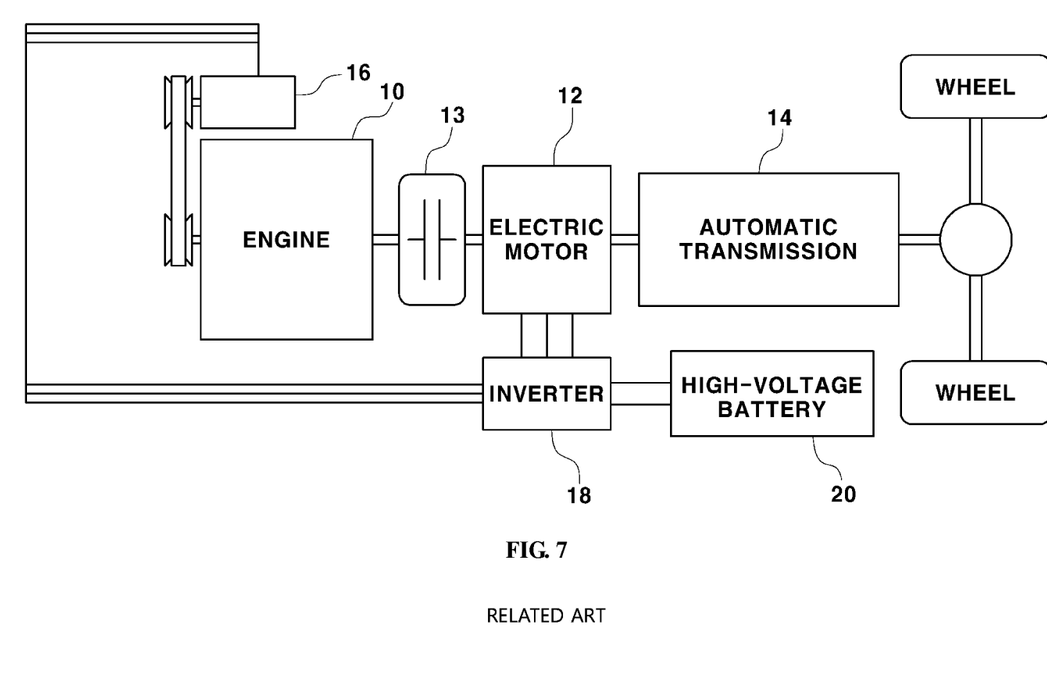
FIG. 7 is an exemplary power transfer system diagram of a hybrid electric vehicle according to the related art.

A hybrid electric vehicle is an environmentally-friendly vehicle that uses a motor and an engine as a power source to reduce exhaust gas usage and improve fuel efficiency. The hybrid electric vehicle includes a powertrain system configured to separately deliver power from the engine or the motor to wheels or to deliver power from both the engine and the motor to the wheels. The powertrain system for hybrid electric vehicles includes, as shown in FIG. 7, may include an engine 10 and a motor 12 arranged in series, an engine clutch 13 disposed between the engine 10 and the motor 12 to transfer or block engine power, an automatic transmission 14 configured to shift and output motor and/or engine power to wheels, a Hybrid Starter Generator (HSG) 16 connected to a crank pulley of the engine 10 and configured to start the engine 10 or to generate electricity, an inverter 18 configured to operate the motor or to generate electricity, and a high-voltage battery 20 chargeably or dischargeably connected to the inverter 18 to provide power to the motor 12.

A PHEV with the structure described above has a forced charging function for forcibly charging a high-voltage battery while driving when a user presses a "high-voltage battery forced charging mode" button, and while driving in an EV driving mode (e.g., a mode of operating a motor without operating an engine) for a predetermined time period after the forced charging is completed, to forcibly charge the high-voltage battery and improve fuel efficiency.

Figure 1:
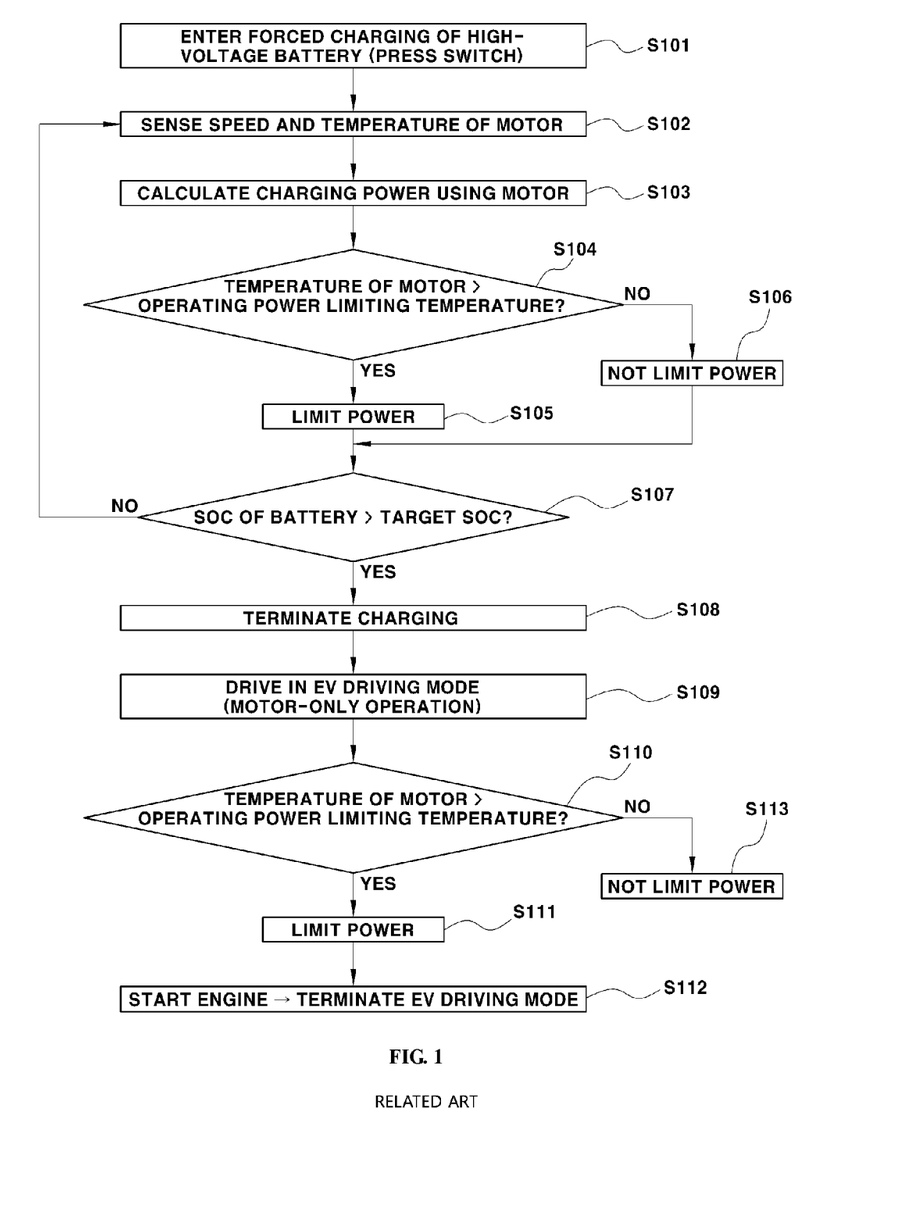
FIG. 1 is an exemplary flowchart illustrating a method of forcibly charging a high-voltage battery according to the related art.

FIG. 1 is an exemplary flowchart illustrating a method of forcibly charging a high-voltage battery according to the related art. The method may be performed by forced electricity generation according to motor-only operation. First, a driver engages a switch for forcibly charging a high-voltage battery, in operation S101. Successively, the speed and temperature of a motor are sensed in operation S102, and charging power for charging the high-voltage battery using the motor is calculated in operation S103.

The charging power may be determined to be less than maximum power when the temperature and speed of the motor are not considered. The sensed current temperature of the motor may be compared to an operating power limiting temperature for motor operation, in operation S104. When the current temperature of the motor is greater than the operating power limiting temperature, the power of the motor for forcibly charging the high-voltage battery is limited in operation S105, and when the current temperature of the motor is less than or equal to the operating power limiting temperature, the power of the motor for forcibly charging the high-voltage battery is not limited in operation S106. When the power of the motor is not limited, the high-voltage battery is forcibly charged according to operation of the motor. A current state of charge (SOC) of the high-voltage battery is compared to a target SOC in operation S107. When the current SOC of the high-voltage battery exceeds the target SOC, the forced charging terminates in operation S108.

The vehicle is driven in an EV driving mode by motor-only operation, in operation S109, and during driving, the current temperature of the motor is again compared to the operating power limiting temperature of the motor in operation S110. When the current operation temperature of the motor is greater than the operating power limiting temperature, the process proceeds to operation S111 of limiting power of the motor after forced charging terminates. When the power of the motor is limited, the vehicle is driven in a HEV driving mode by starting the engine, in operation S112. Meanwhile, when the current temperature of the motor is less than or equal to the operating power limiting temperature, the EV driving mode is maintained since power of the motor is not limited even after forced charging terminates, in operation S113.

However, the method of forcibly charging the high-voltage battery according to the related art has the following problems. First, since forced charging is performed by motor-only operation, charging power and charging speed with respect to the high-voltage battery may be relatively low, which may disable rapid forced charging. Second, when the temperature of the motor is determined as an excessive temperature, forced charging of the high-voltage battery may be disabled due to power limitation of the motor. Third, since the speed and temperature of the motor are not considered during forced charging of the high-voltage battery, it may not be possible to maximally increase an amount of charging over time. Fourth, since the engine starts due to power limitation of the motor when the temperature of the motor is determined to be an excessive temperature after forced charging is completed, a driving time of the EV driving mode is significantly reduced, which may lead to reduced fuel efficiency.

The above information disclosed in this background section is merely for enhancement of understanding of the background of the invention and therefore it may contain information that does not form the prior art that is already known in this country to a person of ordinary skill in the art.

SUMMARY

The present disclosure relates to a method for forcedly charging a high-voltage battery using a motor and a Hybrid Starter Generation (HSG), to forcedly charge the high-voltage battery with maximum charging power using the motor and the HSG at the same time, by calculating maximum chargeable power for the high-voltage battery using three dimensional (3D) maximum charging power maps of the motor and the HSG, adjusting maximum charging power using energy integration during forced charging using the motor and the HSG at the same time, and applying an excessive temperature prevention mode to protect the motor and the HSG from an excessive temperature in a forced charging mode. In one aspect, the present invention provides a method of forcibly charging a high-voltage battery using a motor and a hybrid starter generator (HSG), that may include: sensing speeds and temperatures of the motor and the HSG; calculating maximum chargeable power using three dimensional (3D) maximum charging power maps based on speeds, and torque (e.g., power), and torque applying times of the motor and the HSG; forcibly charging the high-voltage battery with the maximum chargeable power; adjusting maximum charging power using energy integration during the forced charging; executing a first excessive temperature prevention logic for the motor and the HSG to perform the forced charging is continuously by the motor or the HSG, during the forced charging of the high-voltage battery using the motor and the HSG simultaneously; and after the forced charging of the high-voltage battery is completed, executing a second excessive temperature prevention logic to adjust current temperatures of the motor and the HSG below an operating power limiting temperature to improve or maximize a time of an electric vehicle (EV) driving mode in which a vehicle is driven through motor-only operation.

The adjusting of the maximum charging power may include: outputting the maximum charging power using the motor and the HSG simultaneously, and integrating power of the motor and the HSG; and comparing amounts of the integrated power of the motor and the HSG to the 3D maximum charging power maps to extract and detect usable charging power (torque) of the motor and the HSG from the 3D maximum charging power maps. In addition, adjusting of the maximum charging power may include reducing charging power of the motor and the HSG as the amounts of the integrated power of the motor and the HSG increase.

The execution of the first excessive temperature prevention logic may include: comparing the current temperatures of the motor and the HSG to a charging power limiting temperature; continuing to forcibly charge the high-voltage battery using the HSG in response to the motor being in a motor power limited state in which the temperature of the motor exceeds the charging power limiting temperature to prevent motor from generating power; and continuing to forcibly charge the high-voltage battery using the motor in response to the HSG being in a HSG power limited state in which the temperature of the HSG exceeds the charging power limiting temperature to prevent the HSG from generating power.

Additionally, the method may further include: executing the second excessive temperature prevention logic; setting a charging power limiting temperature for limiting power of the motor and the HSG during the forced charging to a temperature below the operating power limiting temperature to limit operation of the motor after the forced charging is completed; and maintaining the current temperatures of the motor and the HSG below the operating power limiting temperature in the EV driving mode after the forced charging is completed. The 3D maximum charging power maps may be experimentally generated based on test results according to speeds, torque (power), and torque applying times of the motor and the HSG, by measuring a time period taken for power limitation to occur due to temperatures of the motor and the HSG based on the speeds of the motor and the HSG and torque application to the motor and the HSG, since maximum charging power of the motor and the HSG may change based on the speeds, torque (power), and torque applying times of the motor and the HSG.

BRIEF DESCRIPTION OF THE DRAWINGS

The above and other objects, features and other advantages of the present invention will be more clearly understood from the following detailed description when taken in conjunction with the accompanying drawings, in which.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
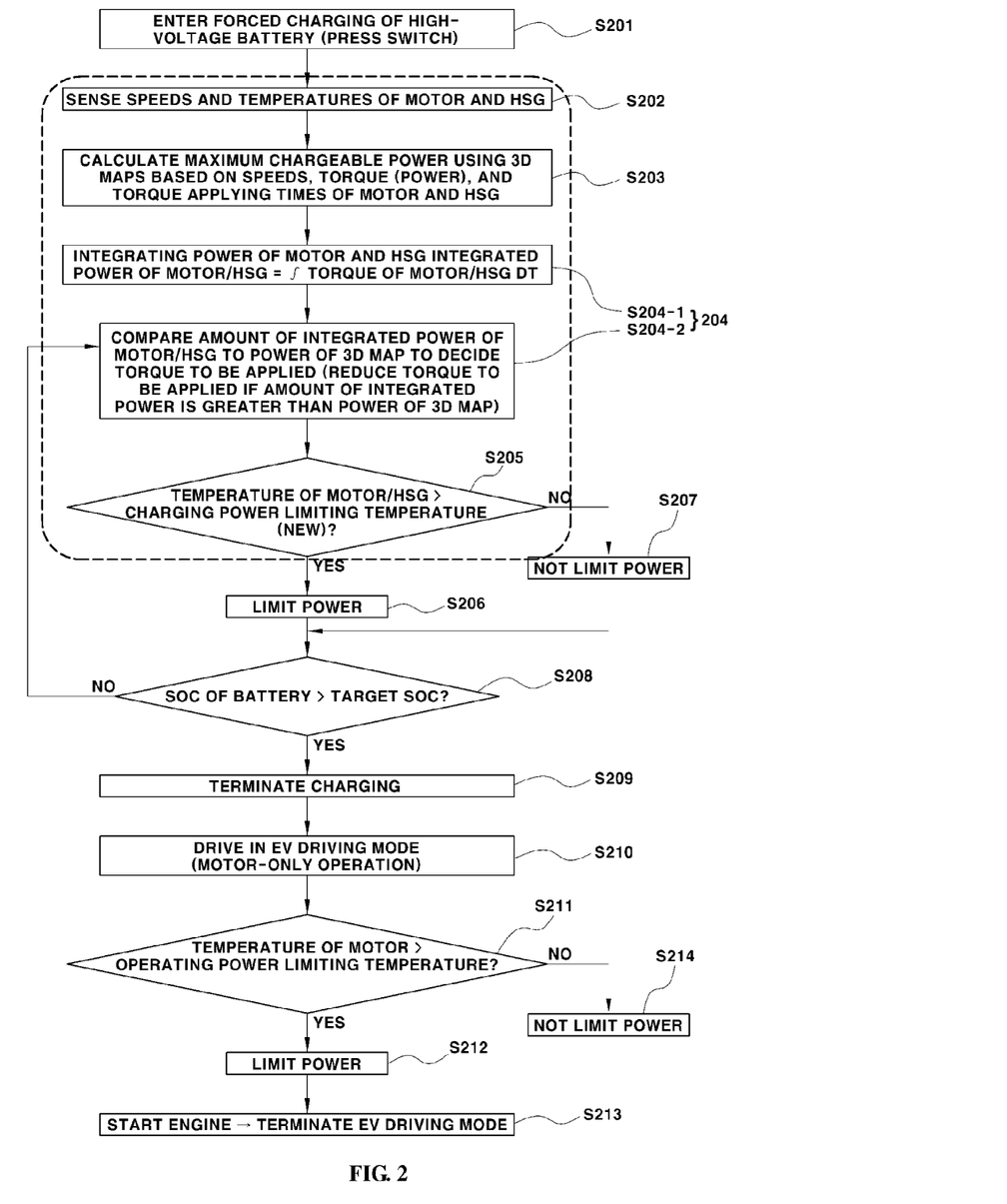
FIG. 2 is an exemplary flowchart illustrating a method of forcibly charging a high-voltage battery using a motor and a Hybrid Starter Generation (HSG), according to an exemplary embodiment of the present disclosure.

The present invention is related to maximally reducing a charging time while increasing an amount of charging of a high-voltage battery over time by forcibly charging the high-voltage battery using a motor and a Hybrid Starter Generator (HSG) simultaneously. FIG. 2 is an exemplary flowchart illustrating a method of forcibly charging a high-voltage battery using a motor and a HSG, according to an exemplary embodiment of the present disclosure. First, a switch may be engaged for forcibly charging a high-voltage battery, in operation S201. In addition, speeds and temperatures of a motor and a HSG may be sensed, in operation S202, and maximum chargeable power may be calculated using three dimensional (3D) maximum charging power maps based on parameters which may include, but are not limited to; speeds, torque (power), and torque applying times of the motor and the HSG, in operation S202.

Since the temperatures of the motor and the HSG may be proportional to the magnitudes of current applied to the motor and the HSG, and the magnitudes of current may vary based on the speeds and torques of the motor and the HSG, power limitation of the motor and the HSG may be associated with the temperatures of the motor and the HSG. Additionally, since the coils of the motor and the HSG may be damaged at a specific temperature or greater, the 3D maximum charging power maps may be generated based on speeds, torque magnitudes (power magnitudes), and torque applying times associated with the temperatures of the motor and the HSG. The 3D maximum charging power maps may be generated by obtaining a combination of speeds, torque magnitudes (power magnitudes), and torque applying times at which the temperatures of the motor and the HSG may increase to maximum usable temperatures to apply maximum power at the sensed temperatures of the motor and the HSG.

Figure 3:
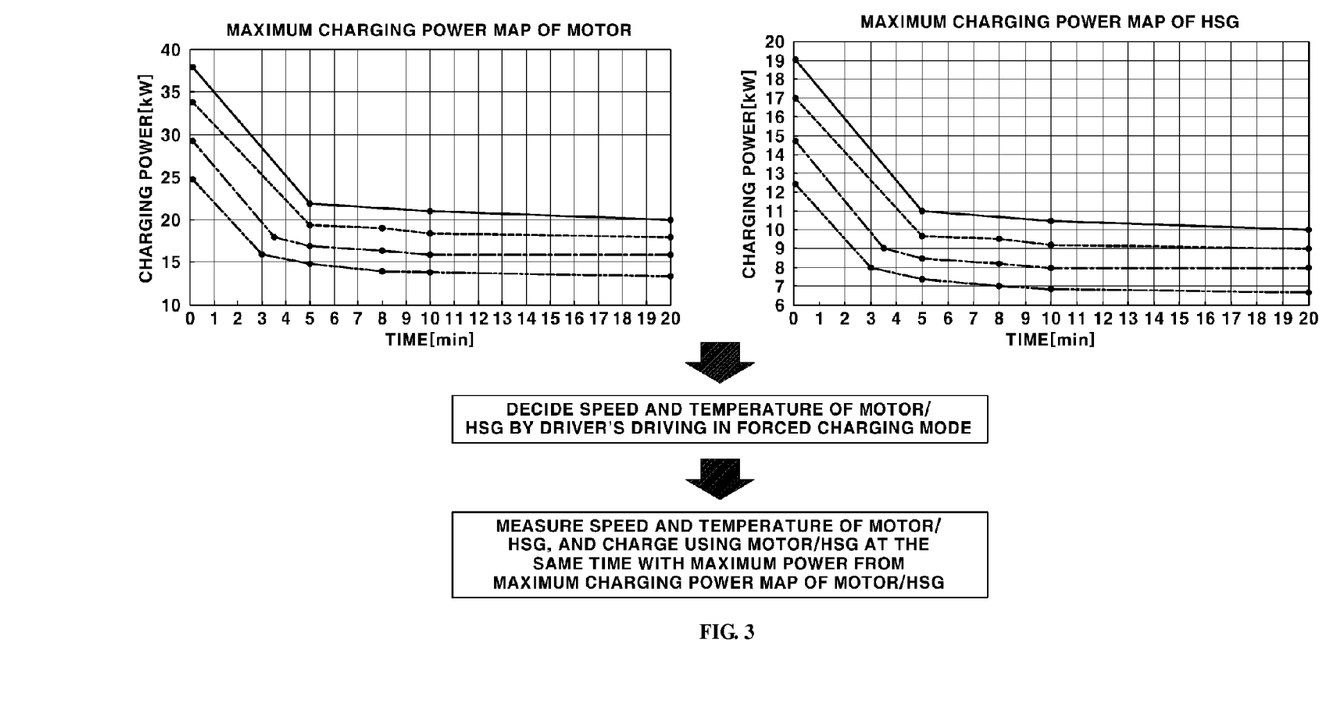
FIG. 3 shows exemplary examples of three dimensional (3D) maximum charging power maps that are used in a method of forcibly charging a high-voltage battery using a motor and a HSG, according to an exemplary embodiment of the present disclosure.

More specifically, the 3D maximum charging power maps may be experimentally generated based on test results according to parameters which may include, but are not limited to: speeds, torques (power), and torque applying times of the motor and the HSG, by measuring a time period taken for power limitation to occur due to temperatures of the motor and the HSG based on the speeds of the motor and the HSG and torque application to the motor and the HSG, since maximum charging power of the motor and the HSG may change based on the speeds, torques (power), and torque applying times of the motor and the HSG. As shown in FIG. 3, the 3D maximum charging power maps may be classified into a motor maximum charging power map and a HSG maximum charging power map.

Accordingly, by sensing the current speeds of the motor and the HSG based on driving when the high-voltage battery is forcibly charged by operation of the motor and the HSG, maximum chargeable power may be calculated from 3D maximum charging power maps based on the sensed speeds of the motor and the HSG, and the high-voltage battery may be forcibly charged with the calculated maximum chargeable power.

In addition, maximum charging power may be adjusted using energy integration during forced charging using the motor and the HSG simultaneously, in operation S204. Since maximum usable charging power may be reduced over time when the high-voltage battery may be forcibly charged using the motor and the HSG simultaneously, maximum charging power may be adjusted using energy integration. In addition, since charging using the motor and the HSG simultaneously may be disabled in a driving mode in which the motor and the HSG may not be used simultaneously (e.g., charging using the motor may be disabled during engine-only operation), maximum charging power may be adjusted using energy integration.

Accordingly, operation S204 of adjusting maximum charging power using energy integration may be performed to integrate energy of the motor and the HSG with respect to time to re-calculate charging power that does not damage hardware. In other words, operation S204 may be performed by integrating power consumed by the motor and the HSG with respect to time to calculate power currently usable by the motor and the HSG from the 3D maximum charging power maps. More specifically, operation S204 of adjusting maximum charging power using energy integration during forced charging using the motor and the HSG simultaneously may include operation S204-1 of outputting maximum charging power using the motor and the HSG simultaneously and integrating power of the motor and the HSG, and operation S204-2 of comparing amounts of the integrated power of the motor and the HSG to the 3D maximum charging power maps to extract and decide currently usable charging power (torque) of the motor and the HSG from the 3D maximum charging power maps.

Figure 4:
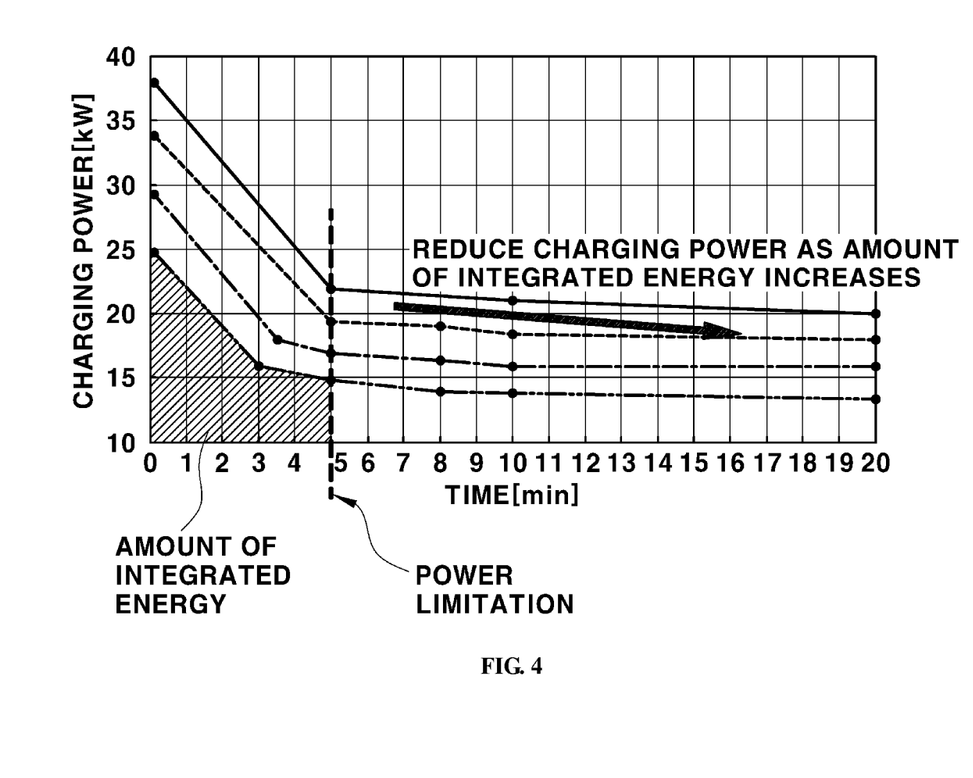
FIG. 4 shows an exemplary graph for describing a process of reducing charging power of a motor as an amount of integrated energy of the motor increases, during forced charging of a high-voltage battery, according to an exemplary embodiment of the present disclosure.

For example, currently usable charging power of the motor may be determined to reduce charging power of the motor from a time of power limitation as an amount of integrated energy (e.g., an amount of integrated power) of the motor increases, as shown in FIG. 4. Accordingly, by performing an operation of re-calculating maximum charging power using energy integration, (e.g., an operation of adjusting maximum charging power using energy integration during forced charging using the motor and the HSG simultaneously), since maximum charging power for forced charging may be reduced over time and a driving mode in which the motor and the HSG may not be used simultaneously, forced charging of the high-voltage battery may be stably performed. In addition, during the forced charging of the high-voltage battery using the motor and the HSG simultaneously, a first excessive temperature prevention logic for the motor and the HSG may be executed. A controller, (not shown) may be configured to operate a temperature sensor and battery charger and to execute logic for carrying out the methods described herein.

Figure 5:
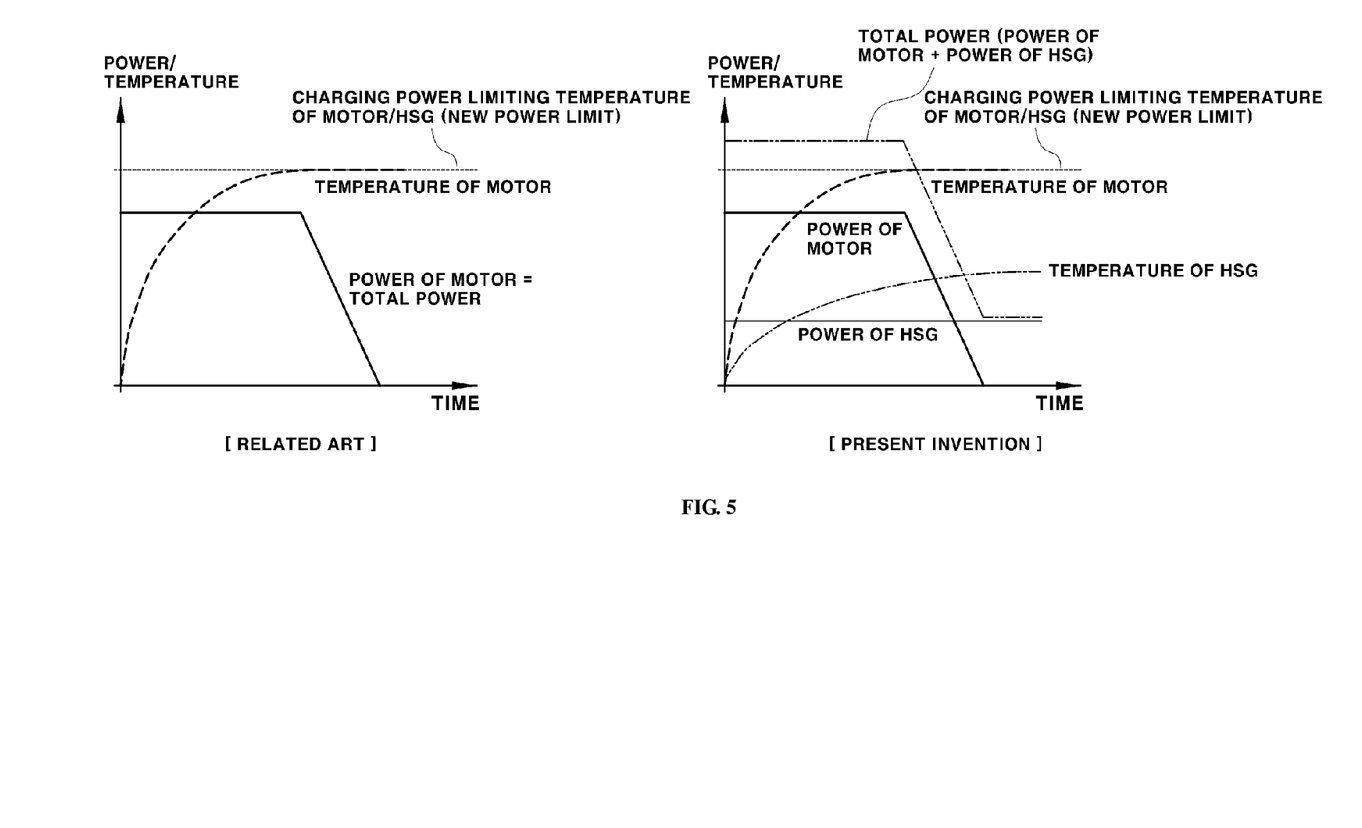
FIG. 5 shows exemplary graphs for describing an excessive temperature prevention logic for a motor and a HSG, which is applied during forced charging of a high-voltage battery, according to an exemplary embodiment of the present disclosure, compared to the related art.

FIG. 5 illustrates exemplary graphs describing the first excessive temperature prevention logic for the motor and the HSG, which may be applied during forced charging of the high-voltage battery, according to exemplary embodiments of the present disclosure, compared to the related art. The first excessive temperature prevention logic according to an exemplary embodiment of the present disclosure may be used to prevent the temperatures of the motor and the HSG from increasing above a predetermined temperature during forced charging by determining a power limiting temperature of the motor and the HSG during forced charging of the high-voltage battery, and to prevent the temperature of the motor from increasing excessively due to use of the motor in the EV driving mode after the forced charging is completed, that is, to prevent the EV driving mode from terminating due to the excessive temperature of the motor.

During forced charging of the high-voltage battery, operation S205 of newly detecting an excessive temperature prevention temperature of the motor and the HSG, (e.g., a charging power limiting temperature of the motor and the HSG), and of comparing the current temperatures of the motor and the HSG to the charging power limiting temperature may be performed. When the current temperatures of the motor and the HSG are greater than the charging power limiting temperature, power of the motor or the HSG may be limited in operation S206, and when the current temperatures of the motor and the HSG are less than or equal to the charging power limiting temperature, power of the motor or the HSG may be not limited allowing charging to be more stably performed, in operation S207.

Since there may be a risk that the temperatures of the motor and the HSG may increase excessively when the temperature of the motor exceeds the excessive temperature prevention temperature, preventing the motor from generating power any longer, forced charging may continue to be performed by the HSG. When the temperature of the HSG exceeds the excessive temperature prevention temperature, forced charging may continue to be performed by the motor. More specifically, in a motor power limited state in which the motor is prevented from generating power since the temperature of the motor exceeds the charging power limiting temperature (e.g., the excessive temperature prevention temperature), forced charging may continue to be performed through HSG-only operation, and in an HST power limited state in which the HSG is prevented from generating power any longer since the temperature of the HSG exceeds the charging power limiting temperature (e.g., the excessive temperature prevention temperature), forced charging may continue to be performed through motor-only operation. Meanwhile, after forced charging of the high-voltage battery is completed, a second excessive temperature prevention logic may be executed to maximize an EV driving time for which the vehicle may be driven through motor-only operation.

Figure 6:
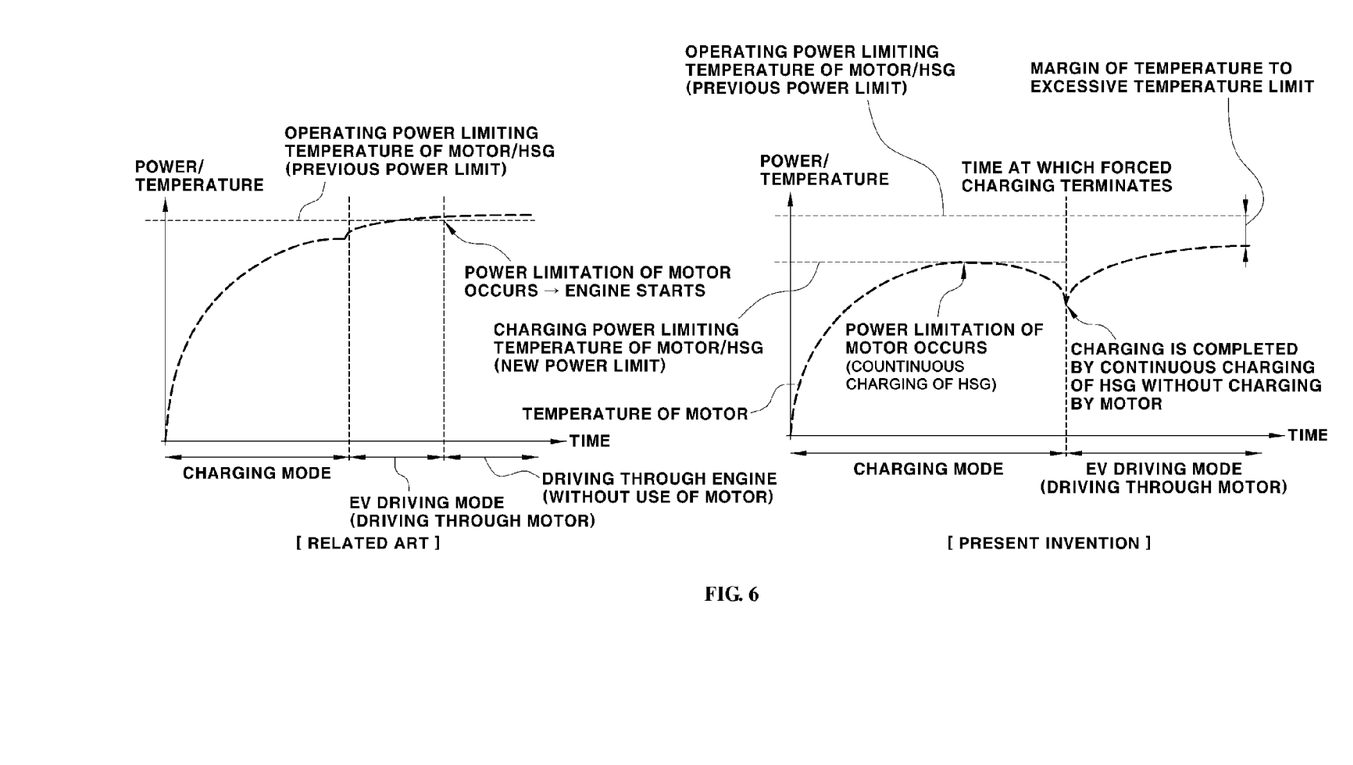
FIG. 6 shows exemplary graphs for describing an excessive temperature prevention logic for a motor and a HSG, which is applied after forced charging of a high-voltage battery, according to an exemplary embodiment of the present disclosure, compared to the related art.

FIG. 6 illustrates exemplary graphs for describing the second excessive temperature prevention logic for the motor and the HSG in consideration of the EV driving mode using motor-only operation after forced charging is completed, compared to the related art. According to the related art, since a substantial amount of motor power is used during forced charging through motor-only operation, the temperature of the motor may approach an excessive temperature prevention level after forced charging is completed. In particular, since the motor may be again used when the vehicle drives in the EV driving mode after forced charging is completed, the temperature of the motor may increase, thus limiting the power of the motor due to an excessive temperature of the motor.

Accordingly, as shown in FIG. 6, due to power limitation of the motor, the engine may start to generate torque required by a driver, and when the engine starts driving in the EV driving mode intended by the driver may be no longer performed, which may lead to deterioration of fuel efficiency. To overcome this problem, a temperature level for excessive temperature prevention may be newly determined to be less than an actual excessive temperature prevention temperature level, through an actual system operation test.

More specifically, to prevent the temperatures of the motor and the HSG from increasing excessively during driving after forced charging is completed, the charging power limiting temperature for limiting power of the motor and the HSG during forced charging may be newly determined to be less than an operating power limiting temperature for limiting operation of the motor after forced charging is completed. Accordingly, as shown in FIG. 6, by setting the charging power limiting temperature of the motor and the HSG below the operating power limiting temperature of the motor and the HSG, when the current temperatures of the motor and the HSG increase to greater than the charging power limiting temperature during forced charging, a control operation of limiting charging power of the motor and the HSG may be performed to reduce the temperatures of the motor and the HSG.

After forced charging is completed, charging power may continue to be limited to decrease the temperatures of the motor and the HSG allowing the current temperatures of the motor and the HSG to be maintained at the operating power limiting temperature. Since a margin of temperature may be ensured until the temperature of the motor increases to the operating power limiting temperature, operating power of the motor may not be limited after forced charging terminates allowing the vehicle to be stably driven in the EV driving mode.

By limiting charging power when the temperatures of the motor and the HSG are greater than the charging power limiting temperature during forced charging, and maintaining the temperature of the motor below the operating power limiting temperature in the EV driving mode through motor-only operation after forced charging terminates, it may be possible to prevent the engine from starting to generate torque required by a driver due to power limitation of the motor after forced charging terminates, and to increase a time of the EV driving mode for improvement of fuel efficiency.

Meanwhile, operation S208 of comparing a current SOC of the high-voltage battery to a target SOC, operation S209 of terminating charging when the SOC of the high-voltage battery exceeds the target SOC, operation S210 of driving the vehicle in the EV driving mode through motor-only operation after forced charging of the high-voltage battery may be completed, operation S211 of comparing the current temperature of the motor to the operating power limiting temperature of the motor during driving, operation S212 of limiting power of the motor after forced charging is completed when the current temperature of the motor is greater than the operating power limiting temperature, operation S213 of driving the vehicle in a HEV driving mode through start-up of the engine when power of the motor is limited, and operation S214 of maintaining the EV driving mode since power of the motor is not limited even after forced charging is completed when the current temperature of the motor is less than or equal to the operating power limiting temperature of the motor may be performed in the same way as in the related art.

Therefore, the present invention may provide the following effects. First, the high-voltage battery may be forcibly charged with maximum charging power using the motor and the HSG simultaneously. Second, since the high-voltage battery may by forcibly charged using the motor and the HSG simultaneously, a charging time may be decreased. Third, it may be possible to reduce or minimize a time period for which charging is disabled due to the temperatures of the motor and the HSG during forced charging, and to prevent a time of the EV driving mode through motor-only operation from being reduced due to power limitation according to the temperature of the motor, after forced charging is completed.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method of forcibly charging a high-voltage battery using a motor and a Hybrid Starter Generator (HSG), comprising:
    sensing, by a controller, speeds and temperatures of the motor and the HSG;
    calculating, by the controller, maximum chargeable power using three dimensional (3D) maximum charging power maps based on speeds, and torque (power), and torque applying times of the motor and the HSG;
    forcibly charging, by the controller, the high-voltage battery with the maximum chargeable power;
    adjusting, by the controller, maximum charging power using energy integration during the forced charging;
    executing, by the controller, a first excessive temperature prevention logic for the motor and the HSG to continuously perform the forced charging by one of the motor and the HSG, during the forced charging of the high-voltage battery using the motor and the HSG simultaneously; and
    executing, by the controller, a second excessive temperature prevention logic for adjusting current temperatures of the motor and the HSG below an operating power limiting temperature to maximize a time of an Electric Vehicle (EV) driving mode in which a vehicle is driven through motor-only operation, in response to the forced charging of the high voltage battery being completed.

2. The method of claim 1, wherein the adjustment of the maximum charging power includes:
    operating, by the controller, the motor and the HSG simultaneously to output the maximum charging power,
    integrating, by the controller, power of the motor and the HSG; and
    comparing, by the controller, amounts of the integrated power of the motor and the HSG to the 3D maximum charging power maps to extract and determine usable charging power of the motor and the HSG from the 3D maximum charging power maps.

3. The method of claim 2, wherein the adjustment of the maximum charging power includes
    reducing, by the controller, charging power of the motor and the HSG in response to an increase in the amounts of the integrated power of the motor and the HSG.

4. The method of claim 1, wherein the adjustment of the maximum charging power includes
    reducing, by the controller, charging power of the motor and the HSG in response to an increase in amounts of the integrated power of the motor and the HSG.

5. The method of claim 1, wherein the execution of the first excessive temperature prevention logic includes:
    comparing, by the controller, the current temperatures of the motor and the HSG to a charging power limiting temperature;
    continuing to forcibly charge, by the controller, the high-voltage battery using the HSG in response to the motor being in a motor power limited state in which the temperature of the motor exceeds the charging power limiting temperature to prevent the motor from generating power; and
    continuing to forcibly charge, by the controller, the high-voltage battery using the motor in response to the HSG being in a HSG power limited state in which the temperature of the HSG exceeds the charging power limiting temperature to prevent the HSG from generating power.

6. The method of claim 1, further comprising:
    executing, by the controller, the second excessive temperature prevention logic;
    setting, by the controller, a charging power limiting temperature predetermined to limit power of the motor and the HSG during the forced charging to a temperature below the operating power limiting temperature for limiting operation of the motor after the forced charging is completed; and
    maintaining, by the controller, the current temperatures of the motor and the HSG below the operating power limiting temperature in the EV driving mode after the forced charging is completed.

7. The method of claim 1, wherein the 3D maximum charging power maps are experimentally generated based on test results according to parameters selected from the group consisting of: speeds, torque (power), and torque applying times of the motor and the HSG.

8. A non-transitory computer readable medium containing program instructions executed by a processor for forcibly charging a high-voltage battery using a motor and a Hybrid Starter Generator (HSG), the computer readable medium comprising:
    program instructions that control a sensor to sense speeds and temperatures of the motor and the HSG;

program instructions that calculate maximum chargeable power using three dimensional (3D) maximum charging power maps based on speeds, and torque (power), and torque applying times of the motor and the HSG;

program instructions that forcibly charge the high-voltage battery with the maximum chargeable power;

program instructions that adjust maximum charging power using energy integration during the forced charging;

program instructions that execute a first excessive temperature prevention logic for the motor and the HSG to continuously perform forced charging by one of the motor and the HSG, during the forced charging of the high-voltage battery using the motor and the HSG simultaneously; and program instructions that execute a second excessive temperature prevention logic for adjusting current temperatures of the motor and the HSG below an operating power limiting temperature to maximize a time of an Electric Vehicle (EV) driving mode in which a vehicle is driven through motor-only operation, in response to the forced charging of the high voltage battery being completed.

9. The non-transitory computer readable medium of claim 8, wherein the program instructions for the adjustment of the maximum charging power include:

program instructions that operate the motor and the HSG simultaneously to output the maximum charging power, program instructions that integrate power of the motor and the HSG; and program instructions that compare amounts of the integrated power of the motor and the HSG to the 3D maximum charging power maps to extract and determine usable charging power of the motor and the HSG from the 3D maximum charging power maps.

10. The non-transitory computer readable medium of claim 9, wherein the program instructions that adjust the maximum charging power includes:

program instructions that reduce charging power of the motor and the HSG in response to an increase in the amounts of the integrated power of the motor and the HSG.

11. The non-transitory computer readable medium of claim 8, wherein the program instruction that adjust the maximum charging power includes:

program instructions that reduce charging power of the motor and the HSG in response to an increase in the amounts of the integrated power of the motor and the HSG.

12. The non-transitory computer readable medium of claim 8, wherein the program instructions that execute the first excessive temperature prevention logic includes:

program instructions that compare the current temperatures of the motor and the HSG to a charging power limiting temperature;

program instructions that continue to forcibly charge the high-voltage battery using the HSG in response to the motor being in a motor power limited state in which the temperature of the motor exceeds the charging power limiting temperature to prevent the motor from generating power; and program instructions that continue to forcibly charge the high-voltage battery using the motor in response to the HSG being in a HSG power limited state in which the temperature of the HSG exceeds the charging power limiting temperature to prevent the HSG from generating power.

13. The non-transitory computer readable medium of claim 8, further comprising:

program instructions that execute the second excessive temperature prevention logic;

program instructions that set a charging power limiting temperature predetermined to limit power of the motor and the HSG during the forced charging to a temperature below the operating power limiting temperature for limiting operation of the motor after the forced charging is completed; and program instructions that maintain the current temperatures of the motor and the HSG below the operating power limiting temperature in the EV driving mode after the forced charging is completed.

14. A system for forcibly charging a high-voltage battery using a motor and a hybrid starter generator (HSG), comprising:

a memory configured to store program instructions; and a controller configured to execute the program instructions, the program instructions when executed configured to:

operate sensor to sense speeds and temperatures of the motor and the HSG;

calculate maximum chargeable power using three dimensional (3D) maximum charging power maps based on speeds, and torque (power), and torque applying times of the motor and the HSG;

forcibly charge the high-voltage battery with the maximum chargeable power;

adjust maximum charging power using energy integration during the forced charging;

execute a first excessive temperature prevention logic for the motor and the HSG to continuously perform the forced charging by one of the motor and the HSG, during the forced charging of the high-voltage battery using the motor and the HSG simultaneously; and execute a second excessive temperature prevention logic for adjusting current temperatures of the motor and the HSG below an operating power limiting temperature to maximize a time of an Electric Vehicle (EV) driving mode in which a vehicle is driven through motor-only operation, in response to the forced charging of the high voltage battery being completed.

15. The system of claim 14, wherein the program instructions for adjusting the maximum charging power includes program instructions when executed further configured to:

operate the motor and the HSG simultaneously to output the maximum charging power, integrate power of the motor and the HSG; and compare amounts of the integrated power of the motor and the HSG to the 3D maximum charging power maps to extract and determine usable charging power of the motor and the HSG from the 3D maximum charging power maps.

16. The method of claim 15, wherein the program instructions for adjusting the maximum charging power includes program instructions when executed further configured to:

reduce charging power of the motor and the HSG in response to an increase in the amounts of the integrated power of the motor and the HSG.

17. The system of claim 14, wherein the program instructions for adjusting the maximum charging power includes program instructions when executed further configured to:

reduce charging power of the motor and the HSG in response to an increase in amounts of the integrated power of the motor and the HSG.

18. The system of claim 14, wherein the program instructions for executing the first excessive temperature prevention logic includes program instructions when executed further configured to:
compare the current temperatures of the motor and the HSG to a charging power limiting temperature;
continue to forcibly charge the high-voltage battery using the HSG in response to the motor being in a motor power limited state in which the temperature of the motor exceeds the charging power limiting temperature to prevent the motor from generating power; and
continue to forcibly charge the high-voltage battery using the motor in response to the HSG being in a HSG power limited state in which the temperature of the HSG exceeds the charging power limiting temperature to prevent the HSG from generating power.

19. The system of claim 14, further comprising program instructions when executed further configured to:
execute the second excessive temperature prevention logic;
set a charging power limiting temperature predetermined to limit power of the motor and the HSG during the forced charging to a temperature below the operating power limiting temperature for limiting operation of the motor after the forced charging is completed; and
maintain the current temperatures of the motor and the HSG below the operating power limiting temperature in the EV driving mode after the forced charging is completed.

20. The system of claim 14, wherein the 3D maximum charging power maps are experimentally generated based on test results according to parameters selected from the group consisting of: speeds, torque (power), and torque applying times of the motor and the HSG.

* * * * *